(12) United States Patent
Kao et al.

(10) Patent No.: US 8,757,518 B2
(45) Date of Patent: Jun. 24, 2014

(54) WATER-SAVING VALVE

(75) Inventors: Chih-Hung Kao, Taipei (TW); Yu-Yueh Kao, Taipei (TW)

(73) Assignee: Highplus International Co., Ltd., Taipei (TW)

( * ) Notice: Subject to any disclaimer, the term of this patent is extended or adjusted under 35 U.S.C. 154(b) by 384 days.

(21) Appl. No.: 13/259,575

(22) PCT Filed: Feb. 12, 2010

(86) PCT No.: PCT/CN2010/000209
§ 371 (c)(1),
(2), (4) Date: Sep. 23, 2011

(87) PCT Pub. No.: WO2011/097769
PCT Pub. Date: Aug. 18, 2011

(65) Prior Publication Data
US 2012/0018661 A1 Jan. 26, 2012

(51) Int. Cl.
*B05B 7/06* (2006.01)
*A62C 31/00* (2006.01)
*B05B 1/30* (2006.01)
*F16K 21/00* (2006.01)
*B05B 1/16* (2006.01)

(52) U.S. Cl.
CPC ............. *B05B 1/3026* (2013.01); *B05B 1/1609* (2013.01); *B05B 1/1636* (2013.01)
USPC ..... 239/582.1; 239/429; 239/443; 239/581.1; 239/581.2; 239/583; 137/801

(58) Field of Classification Search
CPC .. B05B 1/1609; B05B 1/1636; B05B 1/3026; B05B 12/002
USPC ........... 239/428.5, 429, 435, 443, 445, 581.1, 239/581.2, 582.1, 583; 137/625.41, 801; 251/359
See application file for complete search history.

(56) References Cited

U.S. PATENT DOCUMENTS 3,987,965 A * 10/1976 Puma ............................ 239/583
5,704,397 A * 1/1998 Lu ............................ 137/630.15
(Continued)

FOREIGN PATENT DOCUMENTS

CN            2662036 Y      12/2004
CN            2890518 Y       4/2007
(Continued)

OTHER PUBLICATIONS

International Search Report of PCT/CN2010/000209 by the SIPO on Nov. 25, 2010 (13 pgs.).

(Continued)

*Primary Examiner* — Ryan Reis
(74) *Attorney, Agent, or Firm* — C. G. Mersereau; Nikolai & Mersereau, P.A.

(57) ABSTRACT

A water-saving valve assembly has a base, a control valve device and a buffer device. The control valve device is mounted in the base. The water-saving valve assembly is mounted on an exit of a water pipe. Users can control the flowing out or stopping of water in the water pipe via the control valve device. The buffer device provides a gradual effect of switching off and can effectively reduce positive and negative pressure waves generated in the water pipe. Noises and damage to the water pipe are also prevented.

12 Claims, 6 Drawing Sheets

(56) References Cited

U.S. PATENT DOCUMENTS

| | | | |
|---|---|---|---|
| 6,942,195 B2* | 9/2005 | Kao | 251/339 |
| 7,314,062 B2* | 1/2008 | Chen | 137/625.41 |
| 2006/0124181 A1 | 6/2006 | Chen | |

FOREIGN PATENT DOCUMENTS

| CN | 101144552 A | 3/2008 |
|---|---|---|
| CN | 201126052 Y | 10/2008 |
| CN | 100460609 C | 2/2009 |
| CN | 201475344 U | 5/2010 |
| GB | 2177782 A | 1/1987 |

OTHER PUBLICATIONS

English Translation of International Search Report of PCT/CN2010/000209 by the SIPO on Nov. 25, 2010 (7 pgs.).

* cited by examiner

US 8,757,518 B2

WATER-SAVING VALVE

The present invention is a national stage of international application No. PCT/CN2010/000209, filed on Feb. 12, 2010.

BACKGROUND OF THE INVENTION

1. Field of the Invention

The present invention relates to a water-saving valve assembly, and more particularly to a water-saving valve assembly having a buffer function.

2. Description of Related Art

A conventional valve assembly is mounted on a top of a tap and has a simple structure. However, a user has to raise his/her hand to switch off the valve assembly located at the top of the tap after washing And this movement wastes water.

In order to resolve the problem of wasting water, an infrared-sensor valve assembly is created. When being washed, hands of a user are placed at a sensing zone to activate the infrared-sensor valve assembly by means of infrared light. After washing, the infrared-sensor valve assembly is automatically switched off because the hands are removed. Therefore, a water-saving effect is achieved. However, the sensing zone is a specific area. Users may have to try many times to make the hands properly placed in the sensing zone and this is inconvenient.

With reference to FIG. 6, a conventional water-saving valve assembly has a sleeve mount 60 and a control valve device 70 mounted in the sleeve mount 60. The water-saving valve assembly is directly mounted on an exit of a water pipe. The control valve device 70 can be pressed down to switch on or off depending on a user's need. This can save water and is convenient in use.

However, water still tends to flow toward the exit when the water-saving valve assembly is switched off. A kinetic energy of the flowing water becomes an elastic energy. Consequently, a series of positive and negative pressure waves are generated and vibrate in the water pipe until the energy is exhausted by friction. This condition causes discordant noises and damage to the water pipe. Because the water pressure is large, a force applied to the control valve device is large to resist the water pressure. The operation is not smooth and inconvenient.

To overcome the shortcomings, the present invention tends to provide a water-saving valve assembly to mitigate the aforementioned problems.

SUMMARY OF THE INVENTION

The main objective of the invention is to provide a water-saving valve assembly having a buffer function.

A water-saving valve assembly has a base, a control valve device and a buffer device. The control valve device is mounted in the base. The water-saving valve assembly is mounted on an exit of a water pipe. Users can control the flowing out or stopping of water in the water pipe via the control valve device. The buffer device provides a gradual effect of switching off and can effectively reduce positive and negative pressure waves generated in the water pipe. Noises and damage to the water pipe are also prevented.

Other objects, advantages and novel features of the invention will become more apparent from the following detailed description when taken in conjunction with the accompanying drawings.

DETAILED DESCRIPTION OF PREFERRED EMBODIMENT

Figure 1:
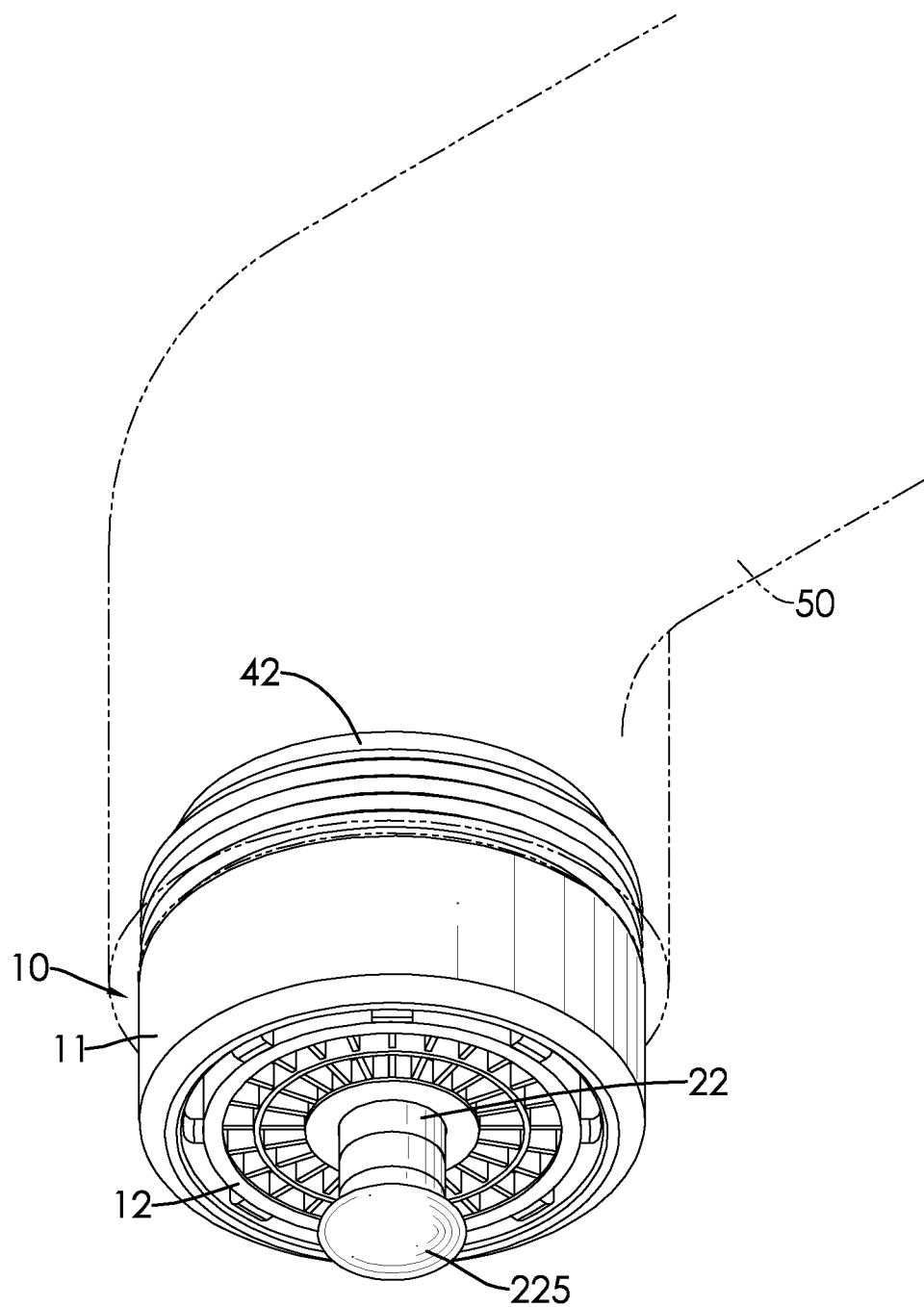
FIG. 1 is a perspective view of a water-saving valve assembly in accordance with the present invention.
Figure 2:
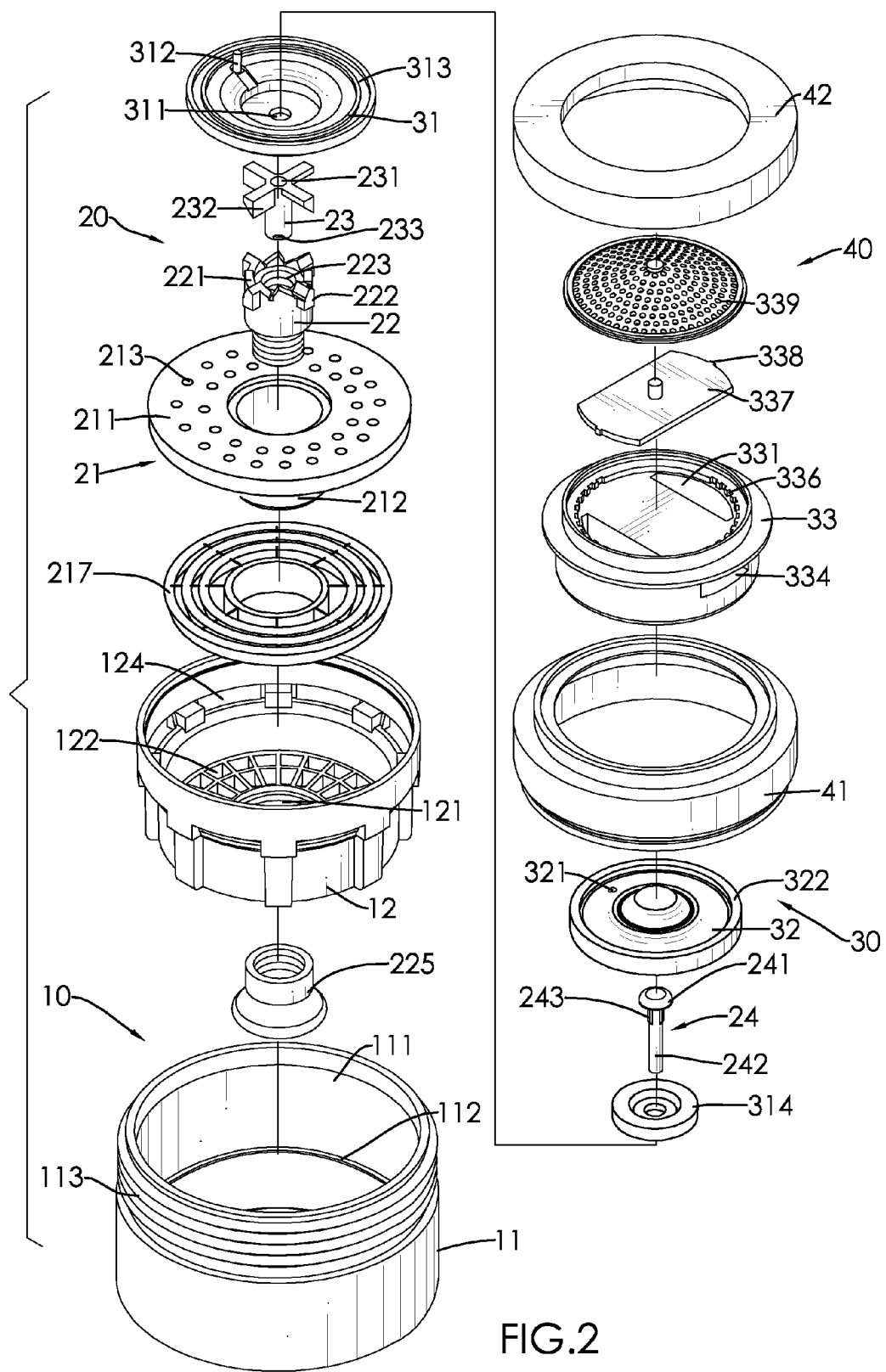
FIG. 2 is an exploded view of the water-saving valve assembly in FIG. 1.
Figure 3:
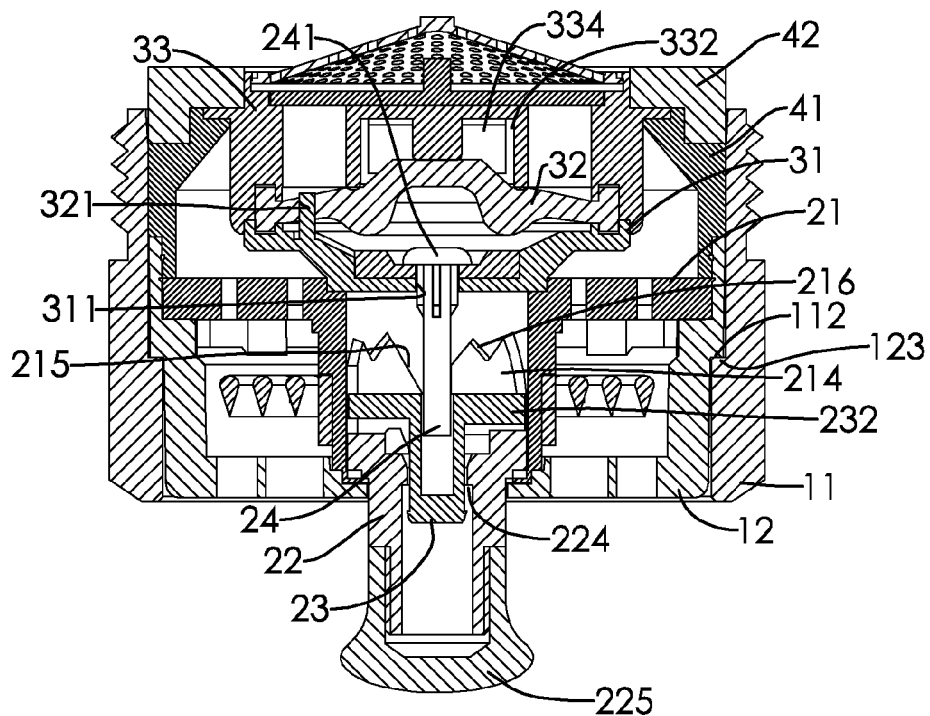
FIG. 3 is a side view of the water-saving valve assembly in FIG. 1.

With reference to FIGS. 1 to 3, a water-saving valve assembly in accordance with the present invention comprises a base 10, a control valve device 20, a buffer device 30 and a cover device 40.

The base 10 has a tube 11 and a foaming sprout 12. An encompassing hole 111 of the tube 11 is located at a central section of the tube 11 and is step-shaped. A diameter of a top end of the encompassing hole 111 is larger than that of a bottom end of the encompassing hole 111. A step surface 112 is formed between the diameter of the top end of the encompassing hole 111 and the diameter of the bottom end of the encompassing hole 111. An exterior threaded surface 113 is formed on an outer surface of the tube 11.

The foaming sprout 12 is mounted in the encompassing hole 111 of the tube 11 and has a through hole 121. The through hole 121 is formed through a central section of a bottom of the foaming sprout 12. Multiple outlets 122 are formed around the through hole 121 and are arranged as a grille with a radiating pattern. An outer surface of the foaming sprout 12 is step-shaped and has a step surface 123 abutting and being abutted by the step surface 112 of the tube 11. Multiple air holes 124 are formed through the step surface 123 at intervals.

The control valve device 20 has a valve mount 21, a pushing rod 22, an abutting rod 23 and a stick 24. The valve mount 21 is a disc 211. A tube 212 is formed on and protrudes downwardly from a central section of the disc 211. The disc 211 has multiple permeable holes 213 formed through the disc 211. Multiple dents 214 and a guiding ditch, not shown in the drawing, are formed on an inner surface of the tube 212. Big dent recesses 215 and small dent recesses 216 are formed between gaps among the dents 214. An optional net frame 217 may be mounted around the tube 212.

The pushing rod 22 is mounted through the tube 212 of the valve mount 21 and has a top end and a bottom end. The bottom end of the pushing rod 22 protrudes out from the valve mount 21. Multiple dents 221 are formed on the top end of the pushing rod 22 and respectively have an outer surface. Multiple chunks 222 are formed on and protrude outwardly from the outer surfaces of the dents 221 of the pushing rod 22 and are mounted in the guiding ditch of the valve mount 21. The pushing rod 22 has a step-shaped penetrating hole 223. The penetrating hole 223 has a step surface 224. An optional knob 225 may be connected with the bottom end of the pushing rod 22.

The abutting rod 23 is mounted in the penetrating hole 223 of the pushing rod 22 and has a channel 231 formed on a central section of the abutting rod 23. Multiple flanks 232 are formed on and protrude from an outer surface of a top end of the abutting rod 23. The flanks 232 are capable of selectively engaging the dents 221 of the pushing rod 22 and engaging the big dent recesses 215 or the small dent recess 216 of the dents 214 of the valve mount 21. Multiple nubs 233 are formed on and protrude from a bottom end of the abutting rod 23 and are capable of abutting the step surface 224 of the pushing rod 22.

The stick 24 is mounted in the channel 231 of the abutting rod 23 and has a top section 241 axially connected with a pole 242. A diameter of the top section 241 is larger than that of the pole 242. Multiple nubs 233 are formed on an outer surface of the pole 24 and are adjacent to a position where the top section 241 is connected with the pole 24.

The buffer device 30 consists of a seat 31, a member 32 and a stand 33. The seat 31 is a round plate having a concave central section. The seat 31 has a water hole 311 formed through the central section of the seat 31. A protrusion 312 is formed on and protrudes from a top surface of the seat 31. A groove 313 is formed in the top surface of the seat 31 near a rim of the seat 31. An optional ring 314 may be mounted on the central section of the seat 31.

The member 32 is mounted on the seat 31 and is a round plate having a central section. The member 32 has a bulge protruding from the central section of the member 32. The member 32 is made of elastic materials, such as rubber. The member 32 has an aperture 321 formed through the member 32. The aperture 321 is capable of corresponding to the protrusion 312 of the seat 31 and is mounted around the protrusion 312 of the seat 31. The aperture 321 has a diameter slightly larger than a radial width of the protrusion 312 of the seat 31. The member 32 has a rim and a flange 322 formed on the rim of the member 32 and has a bottom corresponding to and mounted in the groove 313 of the seat 31.

Figure 5:
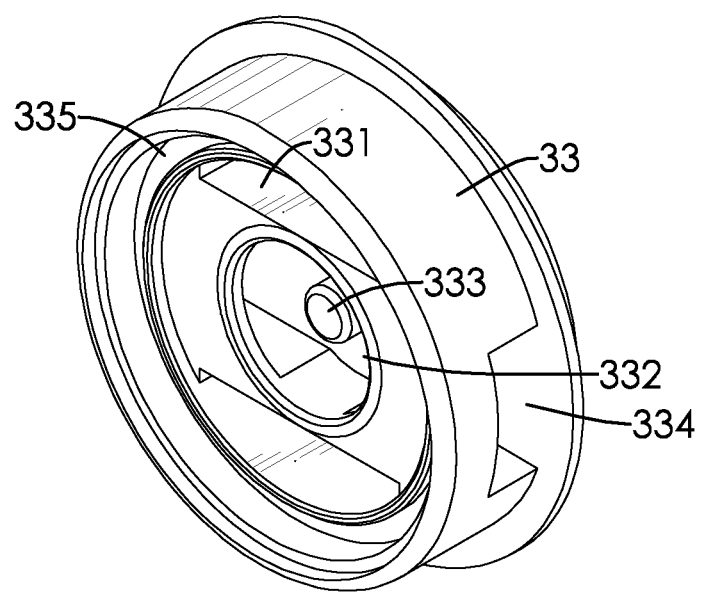
FIG. 5 is a perspective view of a stand of the water-saving valve assembly in FIG. 1.
Figure 6:
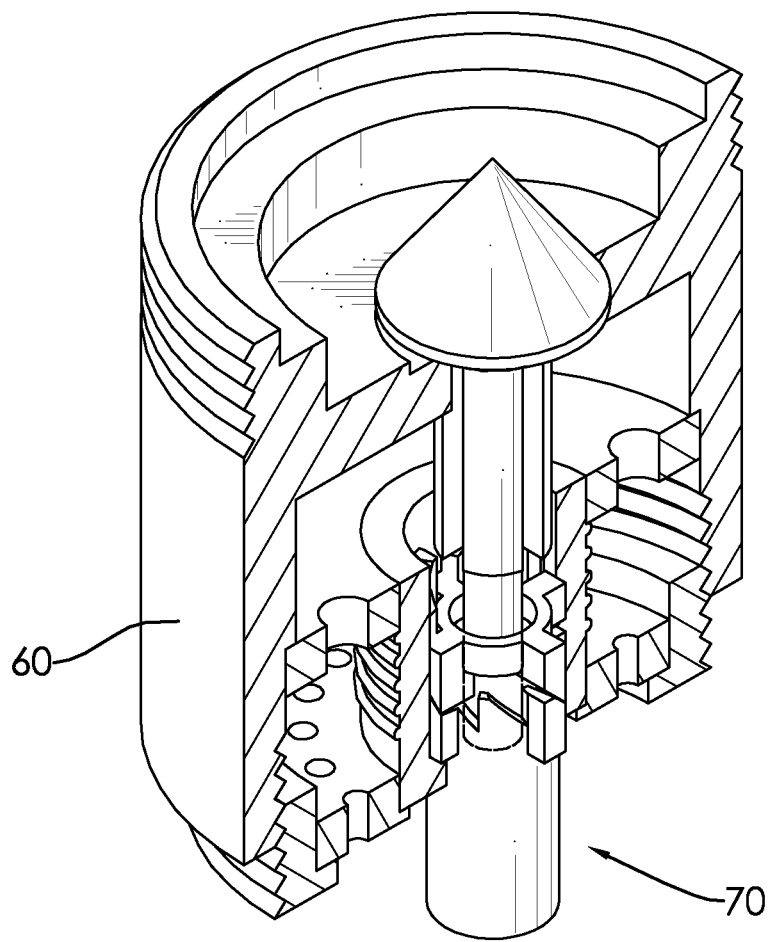
FIG. 6 is a perspective cross sectional view of a conventional water-saving valve assembly in accordance with the prior art.
Figure 7:
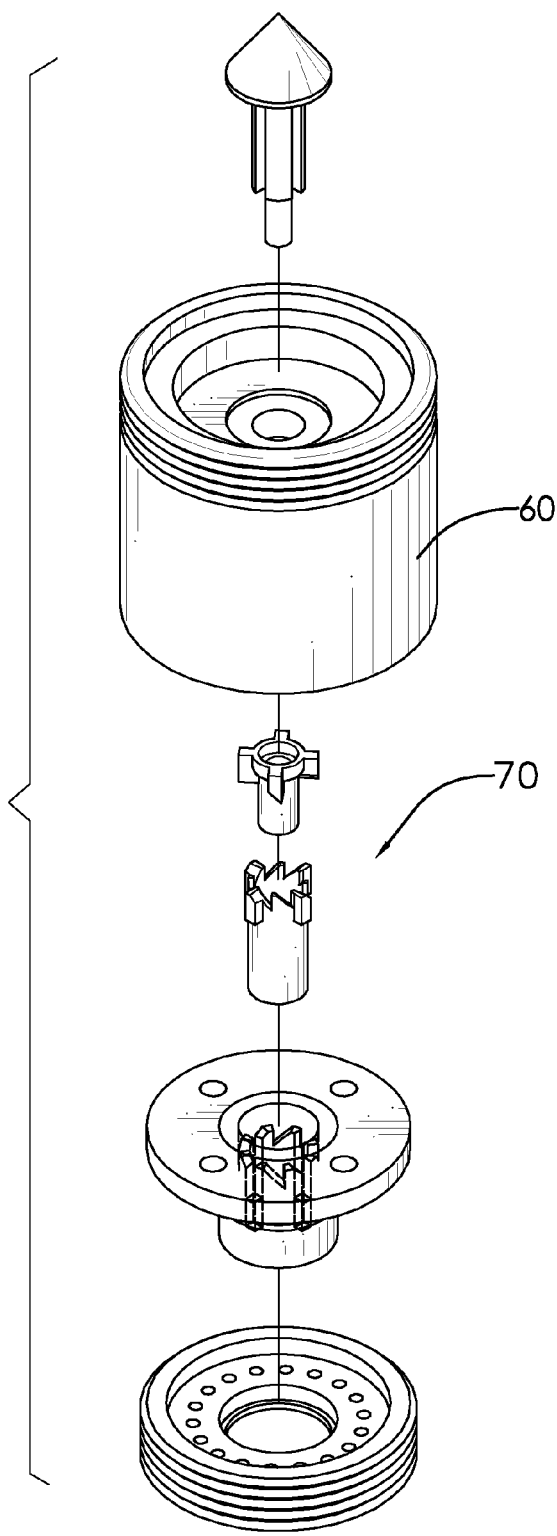
FIG. 7 is an exploded view of the conventional water-saving valve assembly in FIG. 6.

With reference to FIG. 5, the stand 33 is mounted on the member 32 and has at least one inlet 331 axially formed through the stand 33. The stand 33 has a bottom surface having a central section. The stand 33 has a stand recess 332 formed in the central section of the bottom surface of the stand 33. The stand 33 has a shaft 333 protruding in the stand recess 332. The stand 33 has a side surface and at least one water passage 334 formed through the side surface of the stand 33 and communicating with the stand recess 332.

The stand 33 has a bottom surface having a rim. The stand 33 has a trench 335 formed in the rim of the bottom surface of the stand 33 and capable of corresponding to and encompassing the top of the flange 322 of the member 32. In the drawing, two inlets 331 are implemented and are respectively near two opposite sides of the stand 33.

Two water passages 334 are implemented and are respectively near two opposite sides of the stand 33.

An adjusting plate 337 is mounted on a top surface of the stand 33.

The stand 33 has at least one toothed section 336 formed on the top surface of the stand 33. The adjusting plate 337 has at least one lump 338 corresponding to a position of the at least one toothed section 336. The at least one lump 338 can selectively be connected with the at least one toothed section 336 to adjust amount of water flowing into the inlets 331 of the stand 33. A conical screen 339 is connected with a top surface of the adjusting plate 337.

The cover device 40 has a housing 41 and a cover 42 connected with a top end of the housing 41.

The control valve device 20 is mounted in the encompassing hole 111 of the base 10. The pushing rod 22 of the control valve device 20 protrudes out from the foaming sprout 12. The stick 24 of the control valve device 20 is mounted through the ring 314 of the seat 31 of the buffer device 30 and the water hole 311. The buffer device 30 is mounted on the control valve device 20. The cover device 40 is connected with a top end of the base and can position the stand 33 of the buffer device 30.

Figure 4:
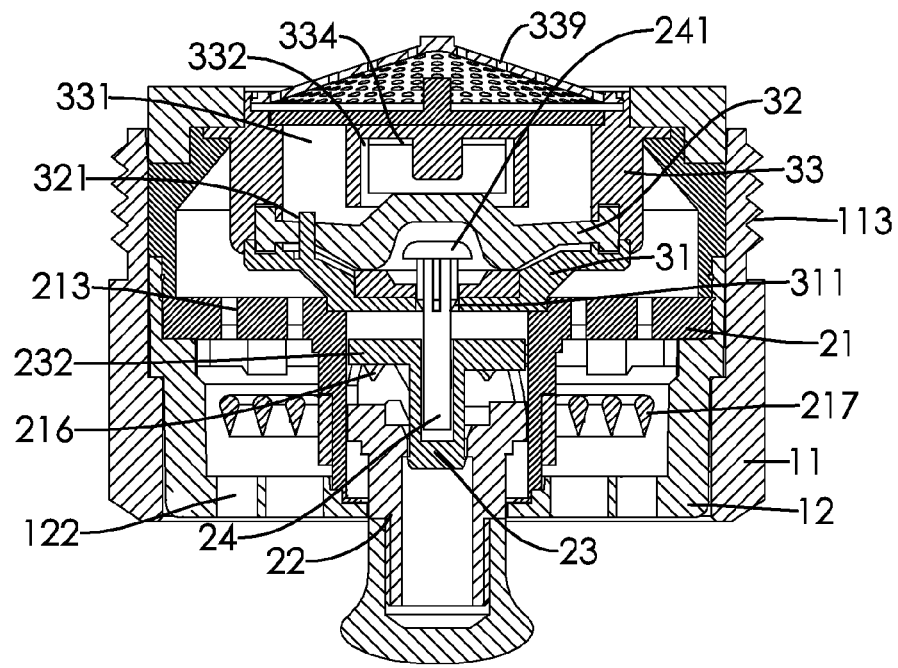
FIG. 4 is another side view of the water-saving valve assembly in FIG. 1.

With reference to FIGS. 1 and 4, the exterior threaded surface 113 is connected with an exit of a water pipe 50. Water sequentially flows through the screen 339, the inlets 331 of the stand 33, the water passages 334 of the stand 33, the permeable holes 213 of the valve mount 21 and the net frame 217. Consequently, water flows out from the outlets 122 of the foaming sprout 12. When water flows, an air pressure difference causes air to enter from the air holes 124 of the foaming sprout 12. Air mixes with water to form foam. Foam and water flow out from the outlets 122 of the foaming sprout 12, so washing is easy and water is saved.

With reference to FIG. 3, the water-saving valve assembly is switched off. The pushing rod 22 is pushed upwardly to drive the abutting rod 23. The flanks 232 of the abutting rod 23 rotate and are positioned in the big dent recesses 215 to make the abutting rod 23 descend. Accordingly, the stick 24 is not pressed by the abutting rod 23 and the stick 24 is pressed by the water pressure to make the top section 241 of the stick 24 clog the water hole 311 of the seat 31. Therefore, water flows through the aperture 321 of the member 32 and is stored in a space between the member 32 and the seat 31. The water pressure makes the bulge of the member 32 protrude upwardly to seal the stand recess 332 of the stand 33. Consequently, water cannot enter the water passages 314 and the water-saving valve assembly is switched off.

With reference to FIG. 4, the water-saving valve assembly is switched on. The pushing rod 22 is pushed upwardly again to drive the abutting rod 23. The flanks 232 of the abutting rod 23 rotate and are positioned in the small dent recesses 216 to make the abutting rod 23 ascend. Accordingly, the stick 24 is pressed by the abutting rod 23 to make the top section 241 of the stick 24 come off the water hole 311 of the seat 31.

Therefore, the water stored in the space between the member 32 and the seat 31 flows out. The bulge of the member 32 descends to come off the stand recess 332 of the stand 33. Consequently, water can enter the water passages 314 and flow out from the outlets 122 of the foaming sprout 12 for use.

During the switching off of the present invention, the member 32 is deformed by the water pressure to seat the stand 33. Because the member 32 is deformed gradually, switching is buffered. Accordingly, vibrating positive and negative pressure waves generated when the present invention is switched off are effectively reduced. And noises and damage to the water pipe are also prevented.

From the above description, it is noted that the present invention has the following advantages:

Because the buffer device is mounted, the switching is buffered and the positive and negative pressure waves generated when the water flow stops suddenly are effectively reduced. And the noises and water pipe's damage due to great vibration are also prevented. Because a buffer function is provided, a force applied to the control valve device by the water pressure is smaller and an operating force applied to the control valve device is smaller. This is easy and convenient in use.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A water-saving valve comprising:
 a base having an encompassing hole;
 a control valve device mounted in the encompassing hole of the base and having a stick; and
 a buffer device mounted on the control valve device and consisting of
  a seat having
   a top surface;
   a water hole formed through the seat and capable of being sealed by the stick; and
   a protrusion formed on and protruding from the top surface of the seat and having a radial width;
  a member mounted on the seat, being a round plate and having
   an aperture formed through the member, mounted around the protrusion of the seat and having a diameter slightly larger than the radial width of the protrusion;
   a central sect ion; and
   a bulge protruding upwardly from the central section of the member; and
  a stand mounted on the member and having
   a bottom surface having a central section;
   a side surface;
   an inlet formed through the stand;
   a stand recess formed in the central section of the bottom surface of the stand; and
   a water passage formed through the side surface of the stand and communicating with the stand recess.

2. The water-saving valve as claimed in claim 1, wherein
 the seat has a rim and a groove formed in the top surface of the seat near the rim of the seat;
 the member has
  a rim; and
  a flange formed on the rim of the member and having
   a top; and
   a bottom corresponding to and mounted in the groove of the seat; and
 the stand has
  a bottom surface having a rim; and
  a trench formed in the rim of the bottom surface of the stand and capable of corresponding to and encompassing the top of the flange of the member.

3. The water-saving valve as claimed in claim 1, wherein the stand has a top surface and an adjusting plate is mounted on the top surface of the stand.

4. The water-saving valve as claimed in claim 2, wherein the stand has a top surface and an adjusting plate is mounted on the top surface of the stand.

5. The water-saving valve as claimed in claim 3, wherein
 the stand has at least one toothed section formed on the top surface of the stand; and
 the adjusting plate has at least one lump corresponding to a position of the at least one toothed section of the stand and connected with the at least one toothed section for positioning.

6. The water-saving valve as claimed in claim 4, wherein
 the stand has at least one toothed section formed on the top surface of the stand; and
 the adjusting plate has at least one lump corresponding to a position of the at least one toothed section of the stand and connected with the at least one toothed section for positioning.

7. The water-saving valve as claimed in claim 1, wherein
 the base has a foaming sprout; and
 the foaming sprout has
  a step-shaped outer surface;
  a bottom having a central section;
  a through hole formed through the central section of the bottom of the foaming sprout;
  multiple outlets formed around the through hole of the foaming sprout and arranged as a grille with a radiating pattern;
  a step surface formed on the outer surface of the foaming sprout; and
  multiple air holes formed through the step surface at intervals.

8. The water-saving valve as claimed in claim 1, wherein
 the control valve device has
  a valve mount having
   an inner surface;
   multiple dents formed on the inner surface of the valve mount; and
   a guiding ditch formed in the inner surface of the valve mount;
  a pushing rod mounted through the valve mount and having
   a top end;
   multiple dents formed on the top end of the pushing rod and respectively having an outer surface; and
   multiple chunks formed on and protruding outwardly from the outer surfaces of the dents of the pushing rod and mounted in the guiding ditch of the valve mount; and
  an abutting rod mounted in the pushing rod and having
   a top end having an outer surface; and
   multiple flanks formed on and protruding from the outer surface of the top end of the abutting rod and capable of selectively engaging the dents of the pushing rod and engaging the dents of the valve mount.

9. The water-saving valve as claimed in claim 1, wherein the water-saving valve further has a cover device connected with a top end of the base and positioning the stand.

10. The water-saving valve as claimed in claim 6, wherein
 the base has a foaming sprout; and
 the foaming sprout has
  a step-shaped outer surface;
  a bottom having a central section;
  a through hole formed through the central section of the bottom of the foaming sprout;
  multiple outlets formed around the through hole of the foaming sprout and arranged as a grille with a radiating pattern;
  a step surface formed on the outer surface of the foaming sprout; and
  multiple air holes formed through the step surface at intervals.

11. The water-saving valve as claimed in claim 10, wherein
 the control valve device has
  a valve mount having
   an inner surface;
   multiple dents formed on the inner surface of the valve mount; and
   a guiding ditch formed in the inner surface of the valve mount;
  a pushing rod mounted through the valve mount and having a top end;

multiple dents formed on the top end of the pushing rod and respectively having an outer surface; and multiple chunks formed on and protruding outwardly from the outer surfaces of the dents of the pushing rod and mounted in the guiding ditch of the valve mount; and an abutting, rod mounted in the pushing rod and having a top end having an outer surface; and multiple flanks formed on and protruding from the outer surface of the top end of the abutting rod and capable of selectively engaging the dents of the pushing rod and engaging the dents of the valve mount.

12. The water-saving valve as claimed in claim 11, wherein the water-saving valve further has a cover device connected with a top end of the base and positioning the stand.

* * * * *